United States Patent
Morris et al.

(10) Patent No.: US 10,635,996 B2
(45) Date of Patent: **\*Apr. 28, 2020**

(54) REPRODUCIBLE SELECTION OF MEMBERS IN A HIERARCHY

(75) Inventors: Richard A. Morris, Harrogate (GB);
Marc P. Skinner, Houghton (GB);
Harsh Sharma, Bangalore (IN)

(73) Assignee: Blue Yonder Group, Inc., Scottsdale, AZ (US)

( \* ) Notice: Subject to any disclaimer, the term of this patent is extended or adjusted under 35 U.S.C. 154(b) by 823 days.

This patent is subject to a terminal disclaimer.

(21) Appl. No.: 11/877,252

(22) Filed: Oct. 23, 2007

(65) Prior Publication Data
US 2008/0040382 A1 Feb. 14, 2008

Related U.S. Application Data

(63) Continuation of application No. 10/035,712, filed on Nov. 8, 2001, now Pat. No. 7,324,983.

(51) Int. Cl.
*G06F 7/00* (2006.01)
*G06Q 10/06* (2012.01)

(52) U.S. Cl.
CPC .................... *G06Q 10/06* (2013.01)

(58) Field of Classification Search
CPC ............. G06F 11/3414; G06F 11/3438; G06F 11/3476
USPC .................... 707/786, 621; 706/48
See application file for complete search history.

(56) References Cited

U.S. PATENT DOCUMENTS

| | | | |
|---|---|---|---|
| 5,421,004 A | 5/1995 | Carpenter et al. | |
| 6,016,553 A | 1/2000 | Schneider et al. | |
| 6,029,175 A * | 2/2000 | Chow | H04L 29/06 |
| 6,067,548 A * | 5/2000 | Cheng | G06Q 10/10 |
| 6,134,539 A | 10/2000 | O'Connor et al. | |
| 6,138,112 A | 10/2000 | Slutz | |
| 6,198,480 B1 * | 3/2001 | Cotugno | G05B 19/0426 715/207 |
| 6,477,531 B1 | 11/2002 | Sullivan et al. | |
| 6,510,420 B1 | 1/2003 | Cessna et al. | |
| 6,532,023 B1 * | 3/2003 | Schumacher | G06F 11/3414 714/E11.193 |
| 6,544,294 B1 * | 4/2003 | Greenfield | G11B 27/034 715/234 |

(Continued)

OTHER PUBLICATIONS

Poh et al., Dynamic construction and refinement of utility-based categorization models; IEEE Transactions on Systems, Man and Cybernetics, vol. 24, Is. 11, Nov. 1994, pp. 1653-1663.

(Continued)

*Primary Examiner* — Alexandria Y Bromell
(74) *Attorney, Agent, or Firm* — Spencer Fane LLP; Steven J. Laureanti

(57) ABSTRACT

A method for selecting members in a hierarchy includes determining a sequence of one or more actions associated with a member selection tree. The actions collectively selecting one or more members from a hierarchy of members. The hierarchy of members is associated with a particular dimension of an organization of data. The method further includes recording the sequence of actions in a member selection script. In addition, the method includes executing the member selection script to select one or more members after the hierarchy of members has been modified.

21 Claims, 4 Drawing Sheets

(56) References Cited

U.S. PATENT DOCUMENTS

| | | | |
|---|---|---|---|
| 6,552,721 B1 | 4/2003 | Ishikawa | |
| 6,587,969 B1* | 7/2003 | Weinberg et al. | 714/46 |
| 6,694,314 B1 | 2/2004 | Sullivan et al. | |
| 6,724,402 B1 | 4/2004 | Baquero | |
| 6,789,252 B1* | 9/2004 | Burke | G06F 8/10 |
| | | | 717/100 |
| 6,812,941 B1 | 11/2004 | Brown et al. | |
| 6,903,723 B1 | 6/2005 | Forest | |
| 7,043,693 B2 | 5/2006 | Wenzel et al. | |
| 7,085,994 B2 | 8/2006 | Gvily | |
| 2002/0067381 A1 | 6/2002 | Hugh | |
| 2002/0087633 A1* | 7/2002 | Nelson | H04L 67/306 |
| | | | 709/204 |
| 2002/0087686 A1* | 7/2002 | Cronk | 709/225 |
| 2002/0111932 A1* | 8/2002 | Roberge | G10L 15/26 |
| 2002/0156803 A1* | 10/2002 | Maslov | G06F 16/958 |
| | | | 715/234 |
| 2002/0184260 A1* | 12/2002 | Martin | G06F 40/18 |
| | | | 715/213 |
| 2003/0009649 A1* | 1/2003 | Martin | G06F 40/18 |
| | | | 712/1 |
| 2003/0018634 A1* | 1/2003 | Shringeri | G06F 16/2428 |
| 2003/0069749 A1* | 4/2003 | Shear | G06Q 20/3674 |
| | | | 705/55 |
| 2003/0088534 A1* | 5/2003 | Kalantar | G06Q 10/06 |
| | | | 706/50 |
| 2006/0206860 A1* | 9/2006 | Dardinski | G05B 15/02 |
| | | | 717/105 |
| 2007/0156677 A1* | 7/2007 | Szabo | G06F 21/6245 |
| 2008/0109242 A1* | 5/2008 | Shear | G06Q 20/3674 |
| | | | 705/1.1 |
| 2008/0183563 A1* | 7/2008 | Raffel | G06Q 10/063118 |
| | | | 705/7.29 |
| 2008/0288306 A1* | 11/2008 | MacIntyre | G06Q 10/063 |
| | | | 705/7.29 |
| 2009/0132996 A1* | 5/2009 | Eldridge | G05B 15/02 |
| | | | 717/108 |

OTHER PUBLICATIONS

Jarke et al., DAIDA: an environment for evolving information systems; ACM Transactions on Information Systems (TOIS), vol. 10, Is. 1, Jan. 1992, pp. 1-50.

S. Chaudhuri, U. Dayal: "An Overview of Data Warehousing and OLAP Technology", 1997, ACM SIGMOD 26 (1) 65-74, DOI: 10.1145/248603.248616.

A. Kurz, A. Min Tjoa: "Data warehousing within intranet: prototype of a web-based executive information system", 1997, DOI: 10.1109/DEXA.1997.617387.

* cited by examiner

REPRODUCIBLE SELECTION OF MEMBERS IN A HIERARCHY

CLAIM OF PRIORITY

This application is a continuation of U.S. patent application Ser. No. 10/035,712, filed on 8 Nov. 2001 and entitled "REPRODUCIBLE SELECTION OF MEMBERS IN A HIERARCHY. U.S. patent application Ser. No. 10/035,712 is commonly assigned to the assignee of the present application. The disclosure of related U.S. patent application Ser. No. 10/035,712 is hereby incorporated by reference into the present disclosure as if fully set forth herein.

BACKGROUND

Technical Field of the Invention

This invention relates to the field of data selection and manipulation, and more particularly to reproducible selection of members in a hierarchy.

Background of the Invention

It is often desirable within a business or other planning environment to generate and/or analyze information regarding sales, demand, supply, selling price, or other data concerning a product or other item. Data for products may often be dependent in some manner on data for other hierarchically related products. For example, sales of products in a particular geographic region may be reflect sales for the products in a particular territory in the region. Because of these hierarchical dependencies, the data concerning various products or other items may be stored hierarchically in data storage or derived in a hierarchical fashion. Furthermore, the data may be stored at a storage location associated with multiple dimensions, such as a product dimension (the storage location being associated with a particular product or product component), a geography dimension (the storage location being associated with a particular geographical area), and a time dimension (the storage location being associated with a particular time or time period).

It is often desirable to select a subset of the members of a hierarchical dimension for use in a particular process (for example, to view planning data associated with particular products). The hierarchical dimensions reflect real world structures in the organization and these structures can change on a frequent basis. When members of a hierarchical dimension are added or deleted, have their position in the hierarchy changed, or have other characteristics changed on a frequent basis, a "hard coded" set of members used to perform a particular business process or function may quickly become out of date and have to be recreated. This process is time-consuming and inefficient and hampers the planning or other functions of a business.

SUMMARY OF THE INVENTION

According to the present invention, disadvantages and problems associated with previous hierarchical member selection techniques have been substantially reduced or eliminated.

According to one embodiment of the present invention, a method for selecting members in a hierarchy includes determining a sequence of one or more actions associated with a member selection tree. The actions collectively selecting one or more members from a hierarchy of members. The hierarchy of members is associated with a particular dimension of an organization of data. The method further includes recording the sequence of actions in a member selection script. In addition, the method includes executing the member selection script to select one or more members after the hierarchy of members has been modified.

Embodiments of the present invention may provide one or more technical advantages. For example, particular embodiments include a system that allows a user to select members from a hierarchical dimension and that can then reproduce a selection of members that meets the same end purpose as the user's selection after the hierarchy members or their relationships change. Such embodiments allow the steps of a user-defined workflow created through a user interface to be quickly defined in a generic and reusable manner. Rather than remembering the members that are selected, such a system remembers the sequence of events the user went through to determine the members that were selected. This sequence of events can then be repeated once the hierarchy is modified and produce a new selection of members that satisfies the user's original intent.

The effective life of such member selection processes may be a significant length of time, spanning many cycles of changes or reorganizations of the underlying hierarchical dimension. This significantly reduces the effort necessary to support a planning or other process that uses the selected members as input and also helps to ensure that the selection continues to be the members that satisfy the original intent of the user, even where there may be changed circumstances (including those of which the user is unaware). Without such a system, the user may have to constantly recreate the member selections (thus wasting time that would be better employed in the business process) or risk that the wrong information will be used in the process due to the selection not being up to date.

Other important technical advantages are readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
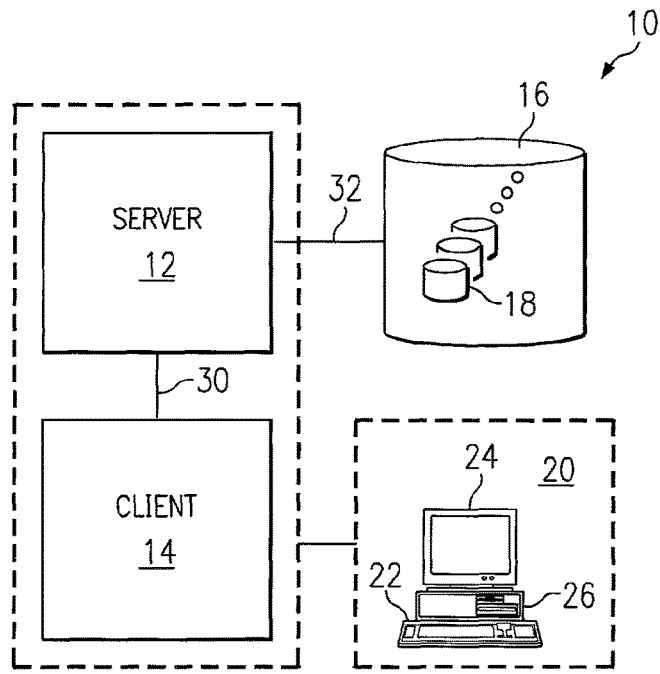
FIG. 1 illustrates an example system for storing and using a hierarchical organization of data.

FIG. 1 illustrates an example system 10 for storing and using a hierarchical organization of data associated with a business or other planning environment. As described below, system 10 may be used to access and store values associated with particular data members in a data storage device or in a representation of data. As examples only, these values may include actual sales, forecasted sales, actual demand, forecasted demand, available supply, selling price, or any other quantifiable data measure associated with a particular product or other item. Furthermore, although products are typically referred to herein, system 10 may be used to store and access data for appropriate tangible or non-tangible items other than products, including but not limited to services or other benefits.

Example system 10 includes a server 12, a client 14, and data storage 16. Server 12 may include one or more processes to receive administration, analysis, and planning input from client 14 and interact with data storage 16 to provide corresponding output to client 14. These processes may be separate processes running on a dedicated processor or these processes may be integrated, in whole or in part, and run on one or more processors within the same or different computers. Similarly, client 14 may include one or more processes that provide appropriate data administration, analysis, and planning input. These processes may be separate processes running on a dedicated processor or these processes may be integrated, in whole or in part, and run on one or more processors within the same or different computers. Client 14 and server 12 may be fully autonomous or may operate at least in part subject to input from users of system 10. Furthermore, although system 10 is described as including client 14 and server 12, any other appropriate components for storing, accessing, managing, manipulating, or otherwise using hierarchical data associated with data storage 16 may also or alternatively be included in system 10.

The term "data storage" is used to refer to any appropriate data source, representation of data, or other organization of data. Data storage 16 may be hierarchical in nature, may be multi-dimensional, and/or may provide persistent data storage for system 10. For example, data storage 16 may be a multi-dimensional database that stores data in a hierarchical and multidimensional format or data storage 16 may be a representation of data derived by server 12 or other appropriate component from data stored in a relational database, in memory, or in any other appropriate location. In one embodiment, data storage 16 includes three-dimensional data and, for each data measure, associates with each storage location 18 a particular member from the product dimension, a particular member from the geography dimension, and a particular member from the time dimension. Each of these particular combinations of members of these three dimensions is associated with a corresponding storage location 18 in data storage 16, similar to each combination of coordinates from the x, y, and z axes being associated with a point in three-dimensional Euclidean space. Furthermore, position within a particular dimension may be changed independent of members of other dimensions, much like the position of a coordinate along the x axis may be changed independent of the positions of other coordinates along the y and z axes in three-dimensional Euclidean space.

Data storage 16 may have as few or as many dimensions as appropriate for the particular application. For example, and not by way of limitation, an enterprise associated with system 10 may not consider geography in connection with its data usage. This might be the case when products are ordered using the Internet or the telephone and then distributed from a single distribution point. In this example, data storage 16 might be two-dimensional rather than three-dimensional and might not reflect positions or members within the geography dimension. Furthermore, the data might be tracked by time, in which case data storage 16 might be two-dimensional and might not reflect positions or members within the time dimension. Other possible scenarios involving more or fewer than three dimensions will be apparent to those skilled in the art. For example, instead of or in addition to a geography dimension, data storage 16 may have a location dimension, a store dimension, or an outlet dimension used to organize the various physical locations where products might be sold. As further examples, data storage 16 might include a supplier dimension or a customer dimension. Data storage 16 may have any number of dimensions appropriate for the needs of the enterprise or facility associated with system 10.

In the three-dimensional example above, the values of the data measures within the set for a particular storage location 18 depend on the combined positions of members within product, geography, and time dimensions for that storage location 18. As a result, the values of the data measures typically vary with these combined positions as appropriate to accurately reflect the sales, demand, available supply, selling price, or other data associated with these members. As described below, when a suitable combination of members is specified in the product, geography, and time dimensions according to operation of system Ia, data storage 16 accesses the data measures for storage location 18 associated with that combination of members. Other suitable dimensions may replace or be combined with the product, geography, and time dimensions according to particular needs.

In one embodiment, data storage 16 supports multi-dimensional on-line analytical processing (OLAP) capability and is populated with data measures received from one or more transactional data sources that are internal, external, or both internal and external to the enterprise or facility associated with system 10. For example, and not by way of limitation, data measures received from sources internal to a manufacturing or warehousing facility may include unit shipping data, dollar shipping data, inventory data, pricing data, and any other suitable information. Data measures received from external sources, such as from syndicated partners of the enterprise or facility, may include point-of-sale demographic data and any other suitable information. Other data that may also or alternatively stored in data storage 16 includes planning data such as plans, forecasts, projections, or the like that are generated by system 10 or a user associated with system 10. Appropriate data measures may be stored in data storage 16 in any suitable manner.

System 10 may operate on one or more computers 20 that are integral to or separate from the hardware and/or software that support server 12, client 14, and data storage 16. Computer 20 may include a suitable input device 22, such as a keypad, mouse, touch screen, microphone, or other device to input information. An output device 24 may convey information associated with the operation of system 10, including digital or analog data, visual information, or audio information. Computer 20 may include fixed or removable storage media, such as magnetic computer disks, CD-ROM, or other suitable media to receive output from and provide input to system 10. Computer 20 may include one or more processors 26 and associated memory to execute instructions and manipulate information according to the operation of system 10. Although only a single computer 20 is shown, server 12, client 14, and data storage 16 may each operate on separate computers 20 or may operate on one or more shared computers 20. Each of the one or more computers 20 may be a work station, personal computer (PC), network computer, personal digital assistant (FDA), wireless data port, or any other suitable computing device.

Server 12 is coupled to data storage 16 using link 32, which may be any wireline, wireless, or other link suitable to support data communications between server 12 and data storage 16 during operation of system 10. Data storage 16 maybe integral to or separate from server 12, may operate on one or more computers 20, and may store any information suitable to support the operation of system 10. Server 12 is coupled to client 14 using link 30, which may be any wireline, wireless, or other link suitable to support communications between server 12, client 14, and the processes of server 12 and client 14 during operation of system 10. Although link 30 is shown as generally coupling server 12 to client 14, processes of server 12 may communicate directly with one or more corresponding processes of client 14.

Figure 2:
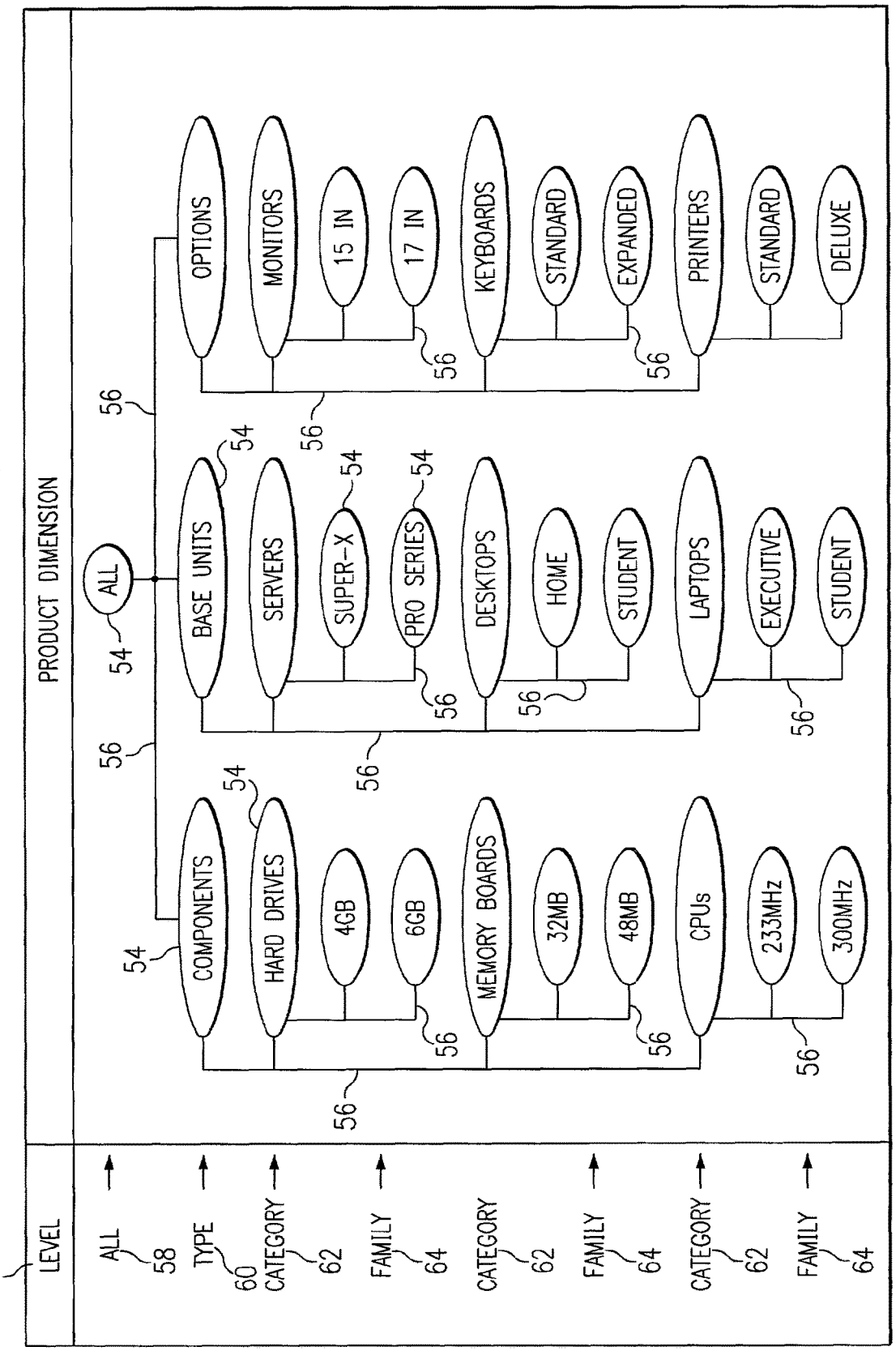
FIG. 2 illustrates an example product dimension within a multi-dimensional organization of data.

FIG. 2 illustrates an example product dimension 50 within data storage 16 that includes a hierarchy of product levels 52 each having one or more members 54. Although one example hierarchy is illustrated, it should be understood that a dimension may have multiple alternative hierarchies. The value of each data measure associated with a member 54 may be an aggregation of the values of corresponding data measures associated with hierarchically related members 54 in lower levels 52 of product dimension 50. In an example embodiment in which system 10 provides sales forecasts, the sales associated with a member 54 is the aggregate sales for these hierarchically related members 54 in lower levels 52 of product dimension 50. In the illustrated embodiment, product levels 52 for product dimension 50 include an all products level 58, a product type level 60, a product category level 62, and a product family level 64. Selected and merely example hierarchical relationships between members 54 are shown using links 56, as described more fully below. Links 56 between hierarchically related members 54 in adjacent levels 52 of product dimension 50 reflect parent-child relationships between members 54. Although FIG. 2 is described primarily in connection with sales relationships, the following description is similarly applicable to other data relationships, such as demand, available supply, selling price, or any other relationships relating to data measures associated with an item or set of items. Furthermore, although described above, the value of measures at aggregated levels may not always be a simple aggregation. A number of alternative aggregation techniques may be used including, but not limited to, averages, minima and maxima, and (in the time dimension) first and last (for example, the value for a month is the value of the first or last week in a month). Values of measures at aggregated levels may also be determined by applying a rule. For example, one example measure is "selling price." Such a measure generally cannot be generated at aggregated levels by any form of aggregation, but can only be generated by applying a rule (for example, (aggregated) sales dollars divided by (aggregated) sales units). Any other appropriate rules may similarly be used.

In the particular example shown in FIG. 2, all products level 58 contains "All" member 54 representing the aggregate sales for all members 54 in lower levels 60, 62, and 64 of product dimension 50. Product type level 60 contains "Components," "Base Units," and "Options" members 54. "Components" member 54 represents the aggregate sales for hierarchically related members 54 below "Components" member 54 in levels 62 and 64 of product dimension 50. Similarly, "Base Units" member 54 represents the aggregate sales for hierarchically related members 54 below "Base Units" member 54 and "Options" member 54 represents the aggregate sales for hierarchically related members 54 below "Options" member 54. Links 56 between "All" member 54 and "Components," "Base Units," and "Options" members 54 indicate the hierarchical relationships between these members 54.

Product category level 62 contains, under "Components" member 54, "Hard Drives," "Memory Boards," and "CPUs" members 54. "Hard Drives" member 54 represents the aggregate sales for hierarchically related members 54 below "Hard Drives" member 54 in level 64 of product dimension 50. Similarly, "Memory Boards" member 54 represents aggregate sales for hierarchically related members 54 below "Memory Boards" member 54 and "CPUs" member 54 represents the aggregate sales for hierarchically related members 54 below "CPUs" member 54. Links 56 between "Components" member 54 and "Hard Drives," "Memory Boards," and "CPUS" members 54 indicate the hierarchical relationships between these members 54. Analogous links 56 reflect hierarchical relationships between "Base Units" and "Options" members 54 of product type level 60 and corresponding members 54 in lower levels 62 and 64 within product dimension 50.

Product family level 64 contains, under "Hard Drives" member 54, "4 GB" and "6 GB" members 54. Links 56 between "Hard Drives" member 54 and "4 GB" and "6 GB" members 54 indicate hierarchical relationships between these members 54. Analogous links 56 reflect hierarchical relationships between "Memory Boards," "CPUs," "Servers," "Desktops," "Laptops," "Monitors," "Keyboards," and "Printers" members 54 of product category level 62 and corresponding members 54 in lower level 64 within product dimension 50. Although no links 56 are shown between members 54 in product family level 64 and possible lower levels 52, such further levels 52 may exist within product dimension 50 and analogous links 56 may exist to reflect the corresponding hierarchical relationships. Furthermore, members 54 shown in FIG. 2 are example only and are not intended to be an exhaustive set of all possible members 54. Those skilled in the art will appreciate that other suitable members 54 and associated links 56 may exist.

Figure 3:
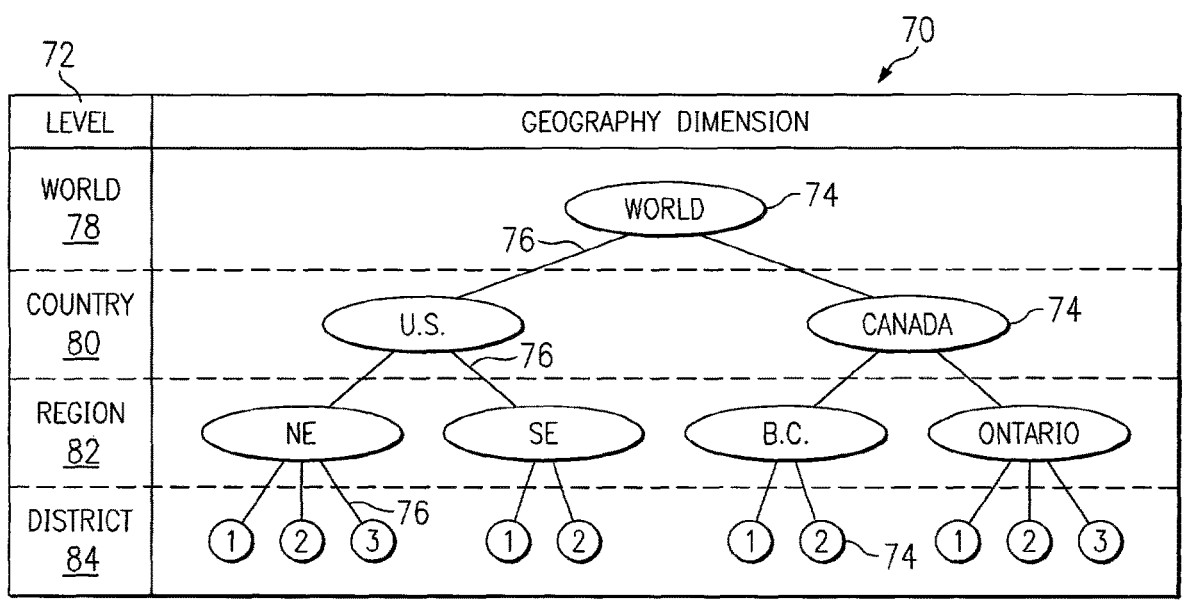
FIG. 3 illustrates an example geography dimension within a multi-dimensional organization of data.

FIG. 3 illustrates an example geography dimension 70 within data storage 16 that includes a hierarchy of geography levels 72 each having one or more members 74. Although one example hierarchy is illustrated, it should be understood that a dimension may have multiple alternative hierarchies. The value of each data measure associated with a member 74 may be an aggregation of the values of corresponding data measures associated with hierarchically related members 74 in lower levels 72 of geography dimension 70 (although other aggregation techniques may be used, as described above). In the example embodiment in which system 10 provides sales forecasts, the sales associated with a member 74 is the aggregate sales for these hierarchically related members 74. In this embodiment, geography levels 72 for geography dimension 70 include a world level 78, a country level 80, a region level 82, and a district level 84. Selected and merely example hierarchical relationships between members 74 are shown using links 76, which are analogous to links 56 described above with reference to FIG. 2. Although FIG. 3 is described primarily in connection with sales relationships, the following description is similarly applicable to other data relationships, such as demand, available supply, selling price, or any other relationships relating to one or more data measures associated with an item or set of items.

In the particular example illustrated in FIG. 3, world level 78 contains "World" member 74 representing aggregate worldwide sales. Country level 80 contains "U.S." and "Canada" members 74, which represent aggregate sales for the United States and Canada, respectively. Link 76 between "U.S." members 74 in country level 80 and "World" members 74 in world level 78 indicates a hierarchical relationship between these members 74. Similarly, link 76 between "Canada" member 74 and "World" member 74 indicates a hierarchical relationship between these members 74. In this example, worldwide sales is an aggregation of aggregate sales in the United States as well as aggregate sales in Canada. Although other links 76 are not described in detail, those skilled in the art will appreciate that links 76 are analogous to links 56 described above with reference to FIG. 2 in that each represents a corresponding hierarchical relationship between members 74 in the various levels 72 of geography dimension 70. As discussed above, geography dimension 70 may be eliminated or otherwise not considered in allocating data, for example, if geography dimension 70 is not relevant to particular data forecasting needs. Data storage 16 might in this situation be two-dimensional.

Sales or other forecasts may be derived using traditional forecasting techniques and suitable information concerning products, geographic areas, customers, and/or other data dimension. Such information may include historical sales, causal factors, key account input, market intelligence, and the like. Forecasting techniques may rely on hierarchical relationships between members 54, 74 to allocate data forecasts for products corresponding to members 54, 74. As described above, the data measures associated with each member 54, 74 are an aggregation of the data measures associated with some or all members 54, 74 in lower levels 52, 72 within the same hierarchy of parent-child links 56, 76. Therefore, given forecast data for a member 54, 74 (a parent) at one level 52, 72, the forecasts for each of the related members 54 in the next lowest level 52, 72 (the children of the parent) may be determined by disaggregating the forecast data for the parent between the children. Furthermore, although the terms "parent" and "children" are used above to identify a relationship between members 54, 74 of a single dimension 50, 70, these terms may also be used to refer to the relationship between data measures or values associated with a storage location 18 associated with a member from each of a number of dimensions. For example, a storage location 18 that includes a sales value for a particular product in a particular state may be hierarchically related to a storage location 18 that includes a sales value for the product in a city of that state (the value associated with the former storage location 18 being a parent of the value associated with the latter storage location 18).

In addition to sales or other data forecasting, numerous other operations may be performed on the data in data storage 16 and data associated with particular members may be accessed for a variety of reasons. In many such cases, a user may desire or be required to select a subset of the members of a hierarchical dimension for use in a particular process (such as viewing planning data or allocating particular data). As described above, the dimensions (such as dimensions 50 and 70) reflect actual structures in the organization. In many types of businesses, these structures can frequently change. When members of a hierarchical dimension are added or deleted, have their position in a hierarchy changed, or have other characteristics changed on a frequent basis, a "hard coded" set of members used to perform a particular business process or function may quickly become out of date and have to be recreated. This process is time-consuming and inefficient are hampers the planning or other functions of a business.

System 10 provides a technique for recording the selection of members that overcomes these problems. This technique, rather than recording the particular members that are selected, remembers the sequence of events the user went through to determine the members that are selected. This sequence of events can then be repeated once the hierarchy is modified and produce a new selection of members that satisfies the user's original intent. The effective life of such member selection processes may be a significant length of time, spanning many cycles of changes or reorganizations of the underlying hierarchical dimension. This significantly reduces the effort necessary to support a planning or other process that uses the selected members as input and also helps to ensure that the selection continues to be the members that satisfy the original intent of the user, even where there may be changed circumstances (including those of which the user is unaware). Without such a system, the user may have to constantly recreate the member selections (thus wasting time that would be better employed in the business process) or risk that the wrong information will be used in the process due to the selection not being up to date.

System 10 (for example, using server 12 and/or client 14) may provide one or more user interfaces that implement a member selection process. Such an interface may display one or more hierarchies of members included in one or more dimension as a "tree-like object." Such tree-like objects are often used in applications such as file directory viewers to illustrate the various hierarchical folders or directories included on a storage device. As with these folders or directories, members in a hierarchy may be selected and branches of the hierarchy may be expanded or collapsed using a user input device 22, such as a mouse. Furthermore, this user interface that can save a sequence of user inputs used to select particular members and can "replay" these inputs to generate a new selection of members based upon the members and hierarchical relationships present when the inputs are replayed.

Figure 4:
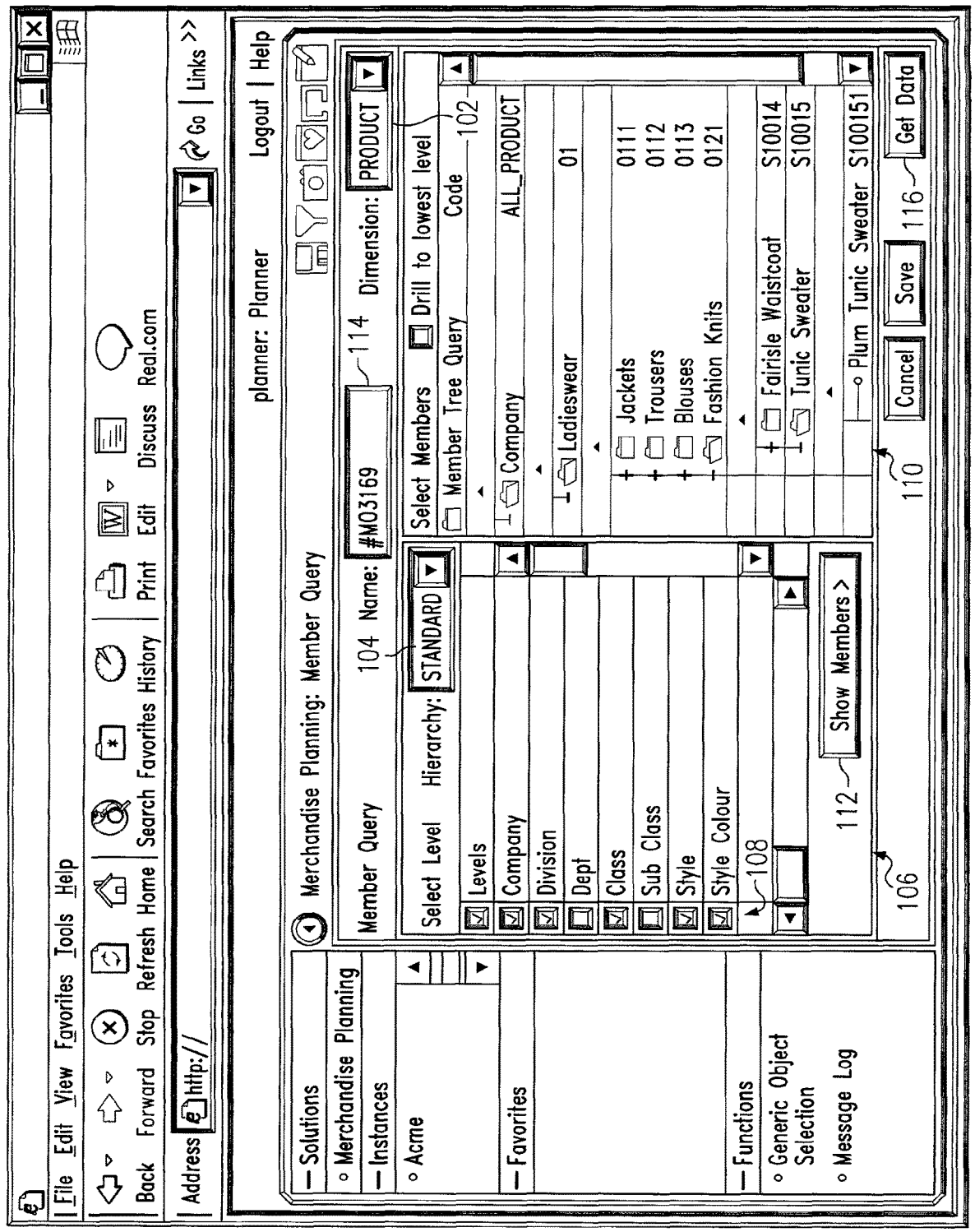
FIG. 4 illustrates an example member selection interface.

FIG. 4 illustrates an example member selection interface 100 that may be provided by system 10. Member selection interface 100 provides a user with the ability to navigate through a hierarchy of members and select particular members the user desires for a particular function. Interface 100 provides a dimension "drop-down" menu 102 or other dimension selection tool that allows a user to select a particular data dimension from which members are to be selected. For example, the user may select a product dimension, a geography dimension, a time dimension, or any other appropriate dimension. Interface 100 allows a user to select members from one of the hierarchies that are valid in the current context and for the selected dimension. The current context is the portion of the data in data storage 16 to which the particular user has access or in which the particular user is interested. A hierarchy "drop-down" menu 104 or other hierarchy selection tool may be provided in interface 100 to allow the user to select a hierarchy associated with the selected dimension.

Furthermore, interface 100 includes a level selection table 106 that identifies each of the levels included in the selected hierarchy. The name of each level in the hierarchy is displayed along with a level selection box 108 or other selection tool that allows the user to indicate the selection of one or more levels in the hierarchy. The level selection dictates what levels are shown in a member selection tree 110 that is also included in interface 100. Member selection tree 110 may hierarchically display the members included in one or more of the levels selected in table 106. Interface 100 may include a button 112 that the user may select to apply the selection of levels in table 106 to tree 110.

Tree 110, like many file navigation tools, allows a user to navigate through the nodes of the tree (in this case, the members of the hierarchy) and to collapse and expand members in tree 110. The user may select a particular member and collapse or expand the portion of the hierarchy below the selected member. For example, clicking on a "+" next to a member may expand the tree below the member and clicking on a "−" next to a member may collapse the tree below the member. Interface 100 may also provide an option that, when selected by the user, fully expands every descendant of a selected member. As described below, the user may select one or more of the members in tree 110 to be used in performing a particular function. The members that are selected may form a "member query" that may be communicated to an appropriate destination (such as server 12) to identify the members that are relevant to the particular function. Interface 100 may provide a name edit box 114 that displays the name of the member query currently being created (through the selection of members in tree 110) to allow the user to subsequently retrieve the query for reuse.

Each member in tree 110 may have associated flags (such as Boolean state flags). One first such flag may be a selection flag that indicates whether the associated member has been selected by the user. Another flag may indicate whether the member has been expanded or collapsed. It should be noted that a child may be expanded even if its parent is collapsed.

There are three core actions that a user may perform on tree 110. The first such action is selecting or deselecting a member. As an example, a user may click or double-click on a member to select or deselect the member. In particular embodiments, if the member is expanded (the children of the member are shown in tree 110), this action will only select or deselect the member itself. If the member is collapsed, this action will select or deselect the member and all descendents of the member. The second action that the user may perform is expanding or collapsing a member. This action sets the state of a member as to whether its direct children should or should not be displayed in the tree.

The third action that the user may perform using tree 110 is to accept the members that have been selected and use these members to form a member query. For example, a user may select a "Get Data" button 116 or other appropriate button to accept a particular selection of members. In particular embodiments when the user accepts the current selection, all members that are both visible and selected are included in the member query. System 10 can determine whether a member is visible in the tree based on the collapsed/expanded flags. A member is visible if all its ancestors have the expanded flag set.

As described above, it is desirable to record a selection of members for later use. However, simply recording a "snapshot" of the selected members in the current hierarchy tree has the problem of recreating the desired member selections when the underlying hierarchical structures change. For example, if a class is moved from department to department (thus moving a member) or if a new store is added in a particular region (thus adding a member), then the tree must automatically reflect the new structures when it is next loaded. The approach implemented in system 10 addresses these problems by recording the sequence of actions that the user took to select particular members and persists these actions instead of the actual tree. The sequence of actions may then be replayed to generate a desirable member selection.

The member selections may be persisted by creating a member selection script that may be used to record and reproduce the actions taken by a user in interface 100. The term "script" as used herein should be understood to include all appropriate formats and techniques for recording user actions so as to allow the actions to be reproduced upon execution of the "script." Such a script may include a sequence of commands and associated parameters. Although example commands and parameters are described below, it should be understood that the following script concepts may be implemented in any appropriate manner using any suitable format. For example, an XML format may be used as an alternative to the example format described below.

One command that may be used in a member selection script is a hierarchy selection (or HIERSELECT) command. An example of such a command is as follows:
    HIERSELECT: hiercode
      [MODE=FRESH|SWITCH|MULTI]
The HIERSELECT command changes the hierarchy on which subsequent script commands operate. A HIERSELECT command may be added to a member selection script when a user selects a hierarchy using hierarchy "drop-down" menu 104 or other hierarchy selection tool of interface 100.

A script may operate concurrently on multiple hierarchies. In such cases, system 10 maintains a selection tree 110 for each of the hierarchies that have been selected. In the example HIERSELECT command, a hiercode parameter may be used to specify the code of the hierarchy (alternatively, a hierarchy name may be specified). The MODE parameter determines how multiple hierarchies are dealt with. If MODE=FRESH is specified (which may be the default), the new hierarchy that is specified in the command is selected and all previous members selections are not considered. If MODE=SWITCH is specified, the new hierarchy that is specified in the command is selected and all previous members selections in any previous hierarchies are not considered, but the member selections in the previous selections are applied to the new hierarchy. If the members are not valid in the new hierarchy then their selection is ignored. If MODE=MULTI is specified, then all member selections in any previous hierarchies are retained.

In addition to providing commands to select hierarchies, the member selection script also provides the ability to designate the selection of particular levels in the selected hierarchy. The script may use a level_id parameter to provide the ability to designate a level included in the selection hierarchy. An example syntax of the level_id parameter is as follows:
    level_id: levelcode|TOP[+n]|BOTTOM[+n]
A level may be specified using the level_id parameter in a number of different ways. For example, a levelcode may be used to identify a level using a level code generated by system 10 or specified by a user. A level may also be identified using the TOP parameter, which identifies the highest level in tree 110. A numeric parameter may supplied with the TOP parameter to identify a level that is n levels down from the highest level. Alternatively, a level may be identified using the BOTTOM parameter, which identifies the lowest level in tree 110. A numeric parameter may be supplied with the BOTTOM parameter to identify a level that is n levels up from the lowest level.

It should be noted that one advantage of providing relative selection of levels (for example, TOP +2) arises when the context in which the query is subsequently deployed is different than the context in which it was defined. For example, when the query is defined, the levels in an example hierarchy may be company, division, department, and class; however, when the query is subsequently used the levels may have been modified to just division, department, class (for example, because a smaller "segment" of the plan was loaded). If the user wants the member selection or other action to occur at the "division" level, the user can use the explicit selection of the level, such that a change in the hierarchy will not affect this action. However, if the users wants the action to always apply to the level below the top level ("division" in the first context, but "department" in the second context), the user can use the relative form of selecting the level.

A level may be selected using a LEVELSELECT command in combination with a specified level_id as follows:
   LEVELSELECT: level_id
A LEVELSELECT command may be included in a member selection script when a user uses a level selection box 108 or other selection tool of interface 100 to select a level. Each of the levels that are defined in the active hierarchy within the current context are available for selection. Selecting or de-selecting a level affects the way that expansion of a member within tree 110 is treated. If a level is not selected, then the members at that level are omitted from tree 110 when their parent is expanded. The descendant members at the next lowest selected level will be added to tree 110 (assuming it is selected). The selected levels also determine to which levels the members are expanded when executing the MEMBEREXPAND command, which is described below. If a level was previously selected then the level remains selected upon its reselection using this command.

A level may be deselected using the following command:
   LEVELDESELECT: level_id
Any members previously selected at the level being deselected will become deselected. A LEVELDESELECT command may be included in a member selection script when a user uses a level selection box 108 or other selection tool of interface 100 to deselect a level.

A level may also be selected or deselected based on the previous state of the level as follows:
   LEVELTOGGLE: level_id
This command selects a level if it was previously deselected and deselects a level if it was previously selected.

As described above, a user may also expand one or more members to view the children of a member. Such a member expansion may be performed by and recorded using the following command:
   MEMBEREXPAND: membercode
      [DEPTH=CHILDREN|numeric|BOTTOM]
This command marks (for example, using a flag) a member as being expanded. The DEPTH parameter defines how far down in the hierarchy to expand to. This parameter may only operate on the active levels. DEPTH=CHILDREN may be the default and should expand the member to the next level down. DEPTH=numeric defines how many levels down the hierarchy to expand to. For example, if DEPTH=2 is specified, it means expand the member to show its children and its grandchildren. DEPTH=BOTTOM means expand to the lowest level in the hierarchy. Again, this parameter may only apply to the active levels defined by prior LEVELSELECT commands.

In a similar manner, members may be collapsed using the following command:
   MEMBERCOLLAPSE: membercode
If children members of a member to be collapsed were previously expanded, then their expanded state should be retained.

When the user has selected a hierarchy, selected appropriate levels in the hierarchy, and/or expanded or collapsed particular members of the selected hierarchy, the user may select one or more members (although the user may select members before, after, or without performing any of these other actions). The selection of a member may be performed by and recorded using the following command:
   MEMBERSELECT: membercode
A MEMBERSLECT command may be added to a member selection script when a user selects a member by clicking on the member or its parent in tree 110 (or otherwise selecting the member). If the member is collapsed, this command marks as selected all of the member's descendents in the tree (note that the descendent members may expanded even though the parent is collapsed). If a selected member is expanded, then there is no change to the selection state of its descendents.

A similar command may be used to deselect a member:
   MEMBERDESELECT: membercode
If the specified member was previously de-selected, then it should remain de-selected. If the member is collapsed, the member and all its descendents in the tree are marked as deselected (note that the descendent members may expanded even though the parent is collapsed). If the member is expanded, then there is no change to the selection state of the descendents.

Another command may be used to toggle the selection state of a member as follows:
   MEMBERTOGGLE: membercode
This command switches a member as being either selected or deselected depending on the previous selection state of the member. The functionality is equivalent to the MEMBERSELECT and MEMBERDESELECT commands.

The following is a sample script that may be created based on a user's actions in interface 100 (alternatively, the user may manually create the script in whole or in part):
   HIERSELECT: STANDARD
   LEVELDESELECT: SUB-CLASS
   MEMBERSELECT: D1
   MEMBEREXPAND: D1
   MEMBERDESELECT: C2
   MEMBEREXPAND: C1
   MEMBERDESELECT: S1

Figure 5:
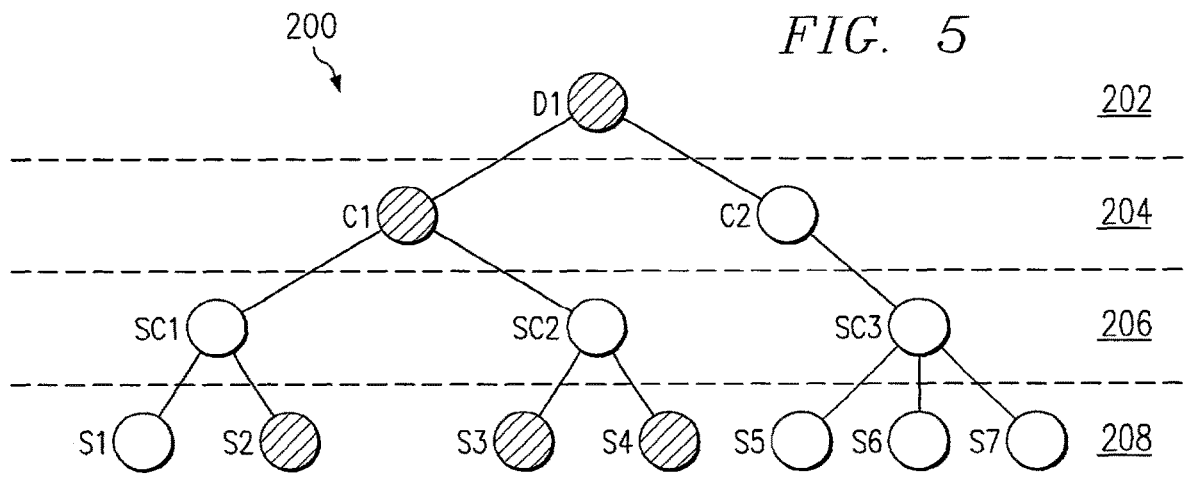
FIG. 5 illustrates an example hierarchy upon which a member selection script may operate.

FIG. 5 illustrates an example hierarchy 200 upon which this example member selection script operates (the "standard" hierarchy specified in the script). Hierarchy 200 includes four levels: department level 202, class level 204, sub-class level 206, and style level 208. As an example only, these may be levels in a standard hierarchy of a product dimension associated with clothing product data. Department level 202 has one member: D1. Class level 204 has two members: C1 and C2. Subclass level 206 has three members: SC1, SC2, and SC3. Style level 208 has seven members: S1, S2, S3, S4, S5, S6, and S7. The hierarchical relationships of these various member are illustrated in FIG. 5.

Upon execution of the above script, the following members will be selected (and are indicated by hatching in FIG. 5): D1, C1, S2, S3, and S4. The script causes the following actions to be taken to reach this set of selected members (and these actions may reflect previous user actions in interface 100 that were recorded in the example script above). First, the illustrated hierarchy is selected. Sub-class level 206 is then deselected so that it is not included in tree 110 of interface 100 (the other levels are selected by default). Next, member D1 is selected. Since D1 was not previously expanded, all of the descendants of D1 are also automatically selected (except those members in sub-class level 206, which was deselected). D1 is then expanded such that its children, C1 and C2 are shown in tree 110. Next, C2 is deselected. Since C2 is collapsed, deselecting C2 also deselects its descendants that were already selected (in this example, S5, S6, and S7-SC3 was never selected since level 206 was deselected). C1 is then expanded to show the descendants at the next selected level, S1, S2, S3, and S4. S1 is then deselected, leaving D1, C1, S2, S3, and S4 as the selected members of hierarchy 200.

Based on an understanding of how a message selection script is created, a user may choose a way of selecting particular members that will produce a desirable member selection even when it is executed after the relevant hierarchy has been modified. The example script represents one technique by which a user may select particular members of style level 208 (as well as other members) through a sequence of actions by the user. This sequence affects what members are selected if the members included in style level 208 changed. For example, if another child of member SCI were added to level 208, this child would end up being selected using example script (since the user had to explicitly deselect S1 given the previous actions the user had taken). However, the same member selection could have been generated using a different sequence of actions. For instance, if D1 was expanded before being selected, then no members in level 208 would have been selected through the selection of D1. Afterwards, the user could have expanded CI and selected particular grandchildren of C1 (for example, S2, S3, and S4, but not S1). In this case, if a new child was later added under SC1, this child would not be selected when the user's actions are reproduced using a member selection script (unlike if the example script above was used). Therefore, the user is able to control the affect of changes in a hierarchy on the members of the hierarchy that are selected based on the user's actions that have been recorded in a script.

Figure 6:
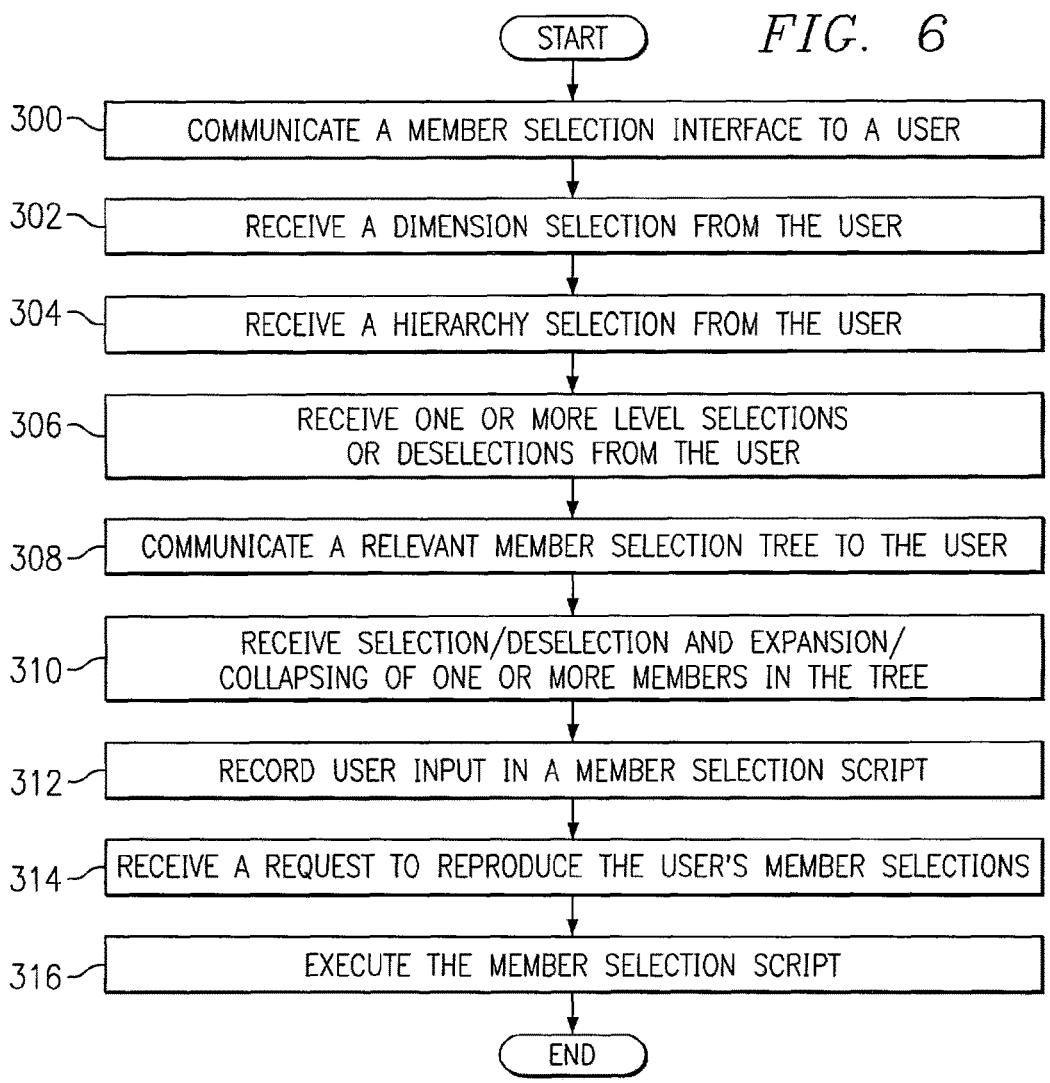
FIG. 6 illustrates an example method for creating and reproducing member selections.

FIG. 6 illustrates an example method for creating and reproducing member selections. The method begins at step 300 where system 10 communicates a member selection interface 100 to a user. As described above, member selection interface 100 may include numerous tools allowing the user to take various actions associated with the selection of members in a hierarchy. Member selection interface 100 may be communicated to the user using any suitable technique. As an example, member selection interface 100 may be displayed to the user as a web page or pages and communicated to the user as an HTML file, an XML file, an applet, a script, or any other appropriate mechanism for generating web pages. The user may provide input by using the web page and an associated web browser to communicate with a web server or other appropriate component. Alternatively, member selection interface 100 may have any other appropriate format and information may be communicated to and received from the user using any suitable technique. For example, member selection interface 100 may be a desktop user interface provided by an application executing locally on a computer.

At step 302, system 10 receives from the user a selection of a dimension from which members are to be selected. System 10 may also receive a selection of a hierarchy of the selected dimension from the user at step 304. At step 306, system 10 may further receive an indication from the user of one or more levels of the hierarchy that are to be displayed to the user when selecting members of the hierarchy. This indication may be the express selection or deselection of particular levels in the hierarchy (and the default may be that all levels are selected). Based on these selections (although some or all of these selection steps may not be performed by the user and are not required), system 10 communicates a member selection tree 110 to the user at step 308. Member selection tree 110 may be displayed to the user in member selection interface 100, as described above. Member selection tree 110 displays the members included in the selected levels in the selected hierarchy of the selected dimension.

At step 310, system 10 receives requests from the user to perform various actions on member selection tree 110 associated with the selection of one or more members. As described above, these actions may include the expansion, collapsing, selection and/or deselection of one or more of the members in tree 110. Furthermore, as described above, these requests are received in a particular sequence that affects which members are eventually selected. System 10 records some or all of the user input described above in a member selection script at step 312. This user input may include the selection of one or more dimensions, hierarchies, and/or levels, as well as the expansion, collapsing, selection, and/or deselection of one or more members. The user input may be recorded in a script as it is received or the input may be temporarily stored and then recorded after the user has finished with the member selection.

As described above, the user's action may be reproduced at a later time to create a member selection. This is true even if the relevant member hierarchy has changed. At step 314, system 10 receives a request from a user, a component of system 10, or any other appropriate source to reproduce a user's previous member selections using a script. System 10 executes the script at step 316 to reproduce the recorded users actions and to generate a set of selected members from a hierarchy, and the method ends. The script may be executed as many times as desired to reproduce the recorded actions.

As an alternative to member selection interface 100, the user may manually create a script. For example, the user may determine the sequence of actions that should be performed to select one or more members and the user may then "program" these action into script. For example, the user may use a word processor or other appropriate tool to generate the script using the commands described above or other appropriate commands (and the script may be compiled or otherwise manipulated to make it executable, if necessary). Furthermore, a user may modify a script that was automatically or manually generated.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for reducing processing time when selecting members from a hierarchy of members comprising:
   receiving input of one or more actions in navigating through a hierarchy of members;
   determining a sequence of the one or more actions associated with the hierarchy of members, the actions collectively selecting one or more members from the hierarchy of members, the hierarchy of members associated with one or more dimensions of an organization of data;
   creating a member selection script by recording the sequence of actions, the member selection script including a hierarchy selection command for determining the sequence of actions; and
   executing the sequence of actions in the recorded member selection script, after the hierarchy of members has been modified, to reproduce the received input to the selection of members in the hierarchy, based upon the members and hierarchical relationships of the received one or more actions in navigating through the hierarchy of members and independent of one or more changes in an underlying structure of the hierarchy thereby reducing processing time relative to methods that do not record the sequence of actions in a member selection script.

2. The method of claim 1, wherein one or more of the actions comprise selecting one or more dimensions from which members are to be selected.

3. The method of claim 1, wherein one or more of the actions comprise selecting the hierarchy from which members are to be selected.

4. The method of claim 1, wherein the member selection script comprises a hierarchy selection command for determining the sequence of actions to be recorded.

5. The method of claim 1, wherein the member selection script comprises a level parameter for determining a level to be included in reproducing the selection of members in the hierarchy.

6. The method of claim 1, wherein the one or more dimensions of an organization of data comprises a product dimension, the product dimension comprises a hierarchy of product levels each having one or more members.

7. The method of claim 1, wherein the one or more dimensions of an organization of data comprises a geography dimension, the geography dimension comprises a hierarchy of geography levels each having one or more members.

8. A system for reducing processing time when selecting members from a hierarchy of members, comprising:
one or more computer systems each comprising one or more processing units and one or more memory units configured to:
receive input of one or more actions in navigating through a hierarchy of members;
determine a sequence of the one or more actions associated with the hierarchy of members, the actions collectively selecting one or more members from the hierarchy of members, the hierarchy of members associated with one or more dimensions of an organization of data;
create a member selection script by recording the sequence of actions, the member selection script including a hierarchy selection command for determining the sequence of actions; and
execute the sequence of actions in the recorded member selection script, after the hierarchy of members has been modified, to reproduce the received input to the selection of members in the hierarchy, based upon the members and hierarchical relationships of the received one or more actions in navigating through the hierarchy of members and independent of one or more changes in an underlying structure of the hierarchy thereby reducing processing time relative to methods that do not record the sequence of actions in a member selection script.

9. The system of claim 8, wherein one or more of the actions comprise selecting one or more dimensions from which members are to be selected.

10. The system of claim 8, wherein one or more of the actions comprise selecting the hierarchy from which members are to be selected.

11. The system of claim 8, wherein the member selection script comprises a hierarchy selection command for determining the sequence of actions to be recorded.

12. The system of claim 8, wherein the member selection script comprises a level parameter for determining a level to be included in reproducing the selection of members in the hierarchy.

13. The system of claim 8, wherein the one or more dimensions of an organization of data comprises a product dimension, the product dimension comprises a hierarchy of product levels each having one or more members.

14. The system of claim 8, wherein the one or more dimensions of an organization of data comprises a geography dimension, the geography dimension comprises a hierarchy of geography levels each having one or more members.

15. A non-transitory computer-readable storage medium embodied with software for reducing processing time when selecting members from a hierarchy of members, the software when executed using one or more computer systems each comprising one or more processing units and one or more memory units:
receives input of one or more actions in navigating through a hierarchy of members;
determines a sequence of the one or more actions associated with the hierarchy of members, the actions collectively selecting one or more members from the hierarchy of members, the hierarchy of members associated with one or more dimensions of an organization of data;
create a member selection script by recording the sequence of actions in a member selection script, the member selection script including a hierarchy selection command for determining the sequence of actions; and
executes the sequence of actions in the recorded member selection script, after the hierarchy of members has been modified, to reproduce the received input to the selection of members in the hierarchy, based upon the members and hierarchical relationships of the received one or more actions in navigating through the hierarchy of members and independent of one or more changes in an underlying structure of the hierarchy thereby reducing processing time relative to methods that do not record the sequence of actions in a member selection script.

16. The non-transitory computer-readable storage medium of claim 15, wherein one or more of the actions comprise selecting one or more dimensions from which members are to be selected.

17. The non-transitory computer-readable storage medium of claim 15, wherein one or more of the actions comprise selecting the hierarchy from which members are to be selected.

18. The non-transitory computer-readable storage medium of claim 15, wherein the member selection script comprises a hierarchy selection command for determining the sequence of actions to be recorded.

19. The non-transitory computer-readable storage medium of claim 15, wherein the member selection script comprises a level parameter for determining a level to be included in reproducing the selection of members in the hierarchy.

20. The non-transitory computer-readable storage medium of claim 15, wherein the one or more dimensions of an organization of data comprises a product dimension, the product dimension comprises a hierarchy of product levels each having one or more members.

21. The non-transitory computer-readable storage medium of claim 15, wherein the one or more dimensions of an organization of data comprises a geography dimension, the geography dimension comprises a hierarchy of geography levels each having one or more members.

* * * * *